United States Patent [19]
Skackelford

[11] Patent Number: 6,092,445
[45] Date of Patent: Jul. 25, 2000

[54] TELESCOPING DIE HOLDER

[76] Inventor: Jerry Lynn Skackelford, 811 W. Whitford St., Sanford, N.C. 27330

[21] Appl. No.: 09/301,452

[22] Filed: Apr. 29, 1999

[51] Int. Cl.$^7$ ..................................................... B23G 1/00
[52] U.S. Cl. .............................. 82/110; 82/111; 408/238; 470/66
[58] Field of Search ....................... 82/110, 111; 408/238, 408/221, 223, 216, 239 R; 470/66, 67, 183, 185, 207

[56] References Cited

U.S. PATENT DOCUMENTS

| | | | |
|---|---|---|---|
| 2,256,611 | 9/1941 | Cote | 408/238 |
| 2,269,221 | 1/1942 | Pealer | 408/238 X |
| 2,383,991 | 9/1945 | Sarossy | 408/221 X |
| 2,855,613 | 10/1958 | Kostka | 10/109 |
| 3,599,260 | 8/1971 | Lesh | 470/67 |
| 5,271,697 | 12/1993 | Johnson et al. | 408/222 |
| 5,343,787 | 9/1994 | McDonnell | 82/110 |
| 5,507,608 | 4/1996 | Forslind | 408/239 A |
| 5,636,851 | 6/1997 | Kanaan | 279/46.7 |

*Primary Examiner*—Henry W. H. Tsai
*Attorney, Agent, or Firm*—Patent & Trademark Services; Thomas Zack; Joseph H. McGlynn

[57] ABSTRACT

A telescoping die holder apparatus a having a outer covering shell with a tapered rear morse into which a shank is fitted. This shank is associated with a biasing member and is reciprocally mounted to the shell by two retaining pins. Each of the pins extend through the shell into one of the four spaced shank slots that run lengthwise in the shank. Each shank slot is closed at one end and opened at the other end. At their opened ends the slots have outwardly opening chamfer rear ends. One end of the shank allows for a replaceable held die that is used to engage a rotatable work piece stock. At the shell's opposite end, a morse tapered end on the shell fits in the lathe's tail stock. An front optional adaptor can be placed in a large inner diameter opening in an enlarged front end of the shank and is used to accommodate a smaller sized die. The entire telescoping die holder is non-rotatable, including any of its parts, as the lathe turns the retained work piece stock and the stock engages the shank's retained die.

4 Claims, 4 Drawing Sheets

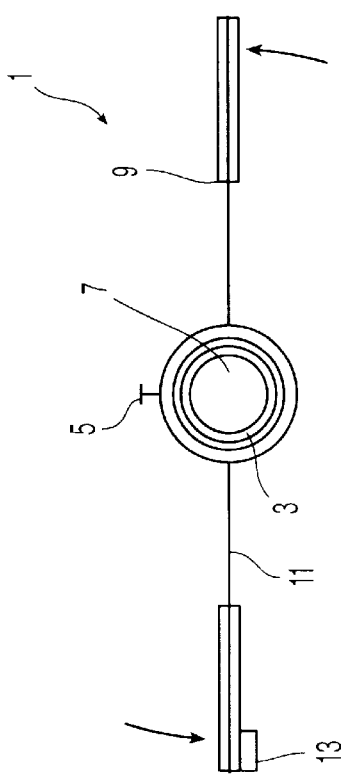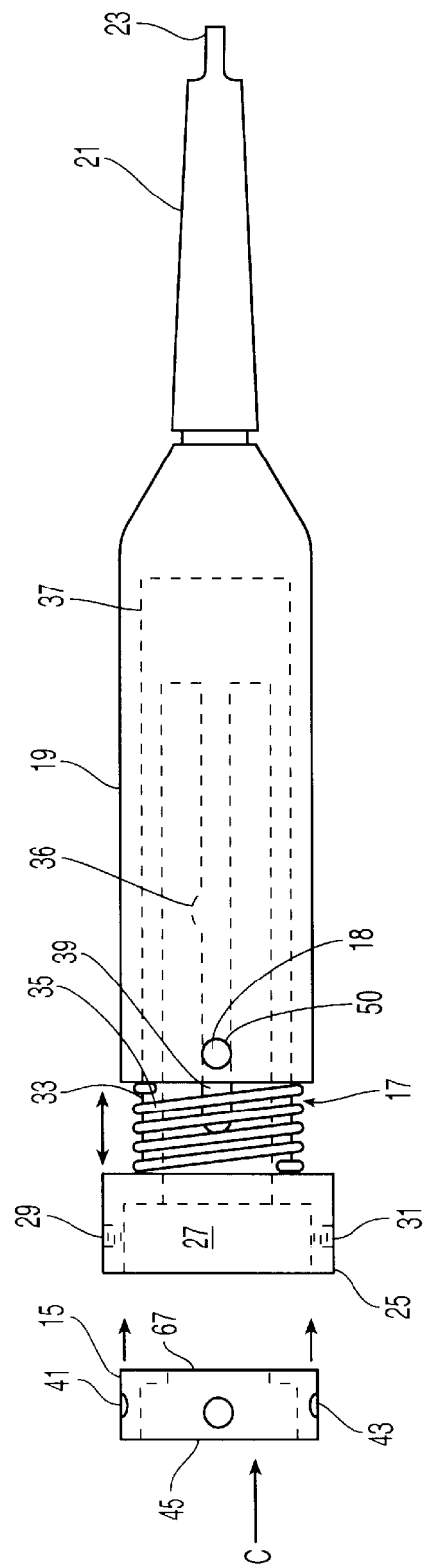

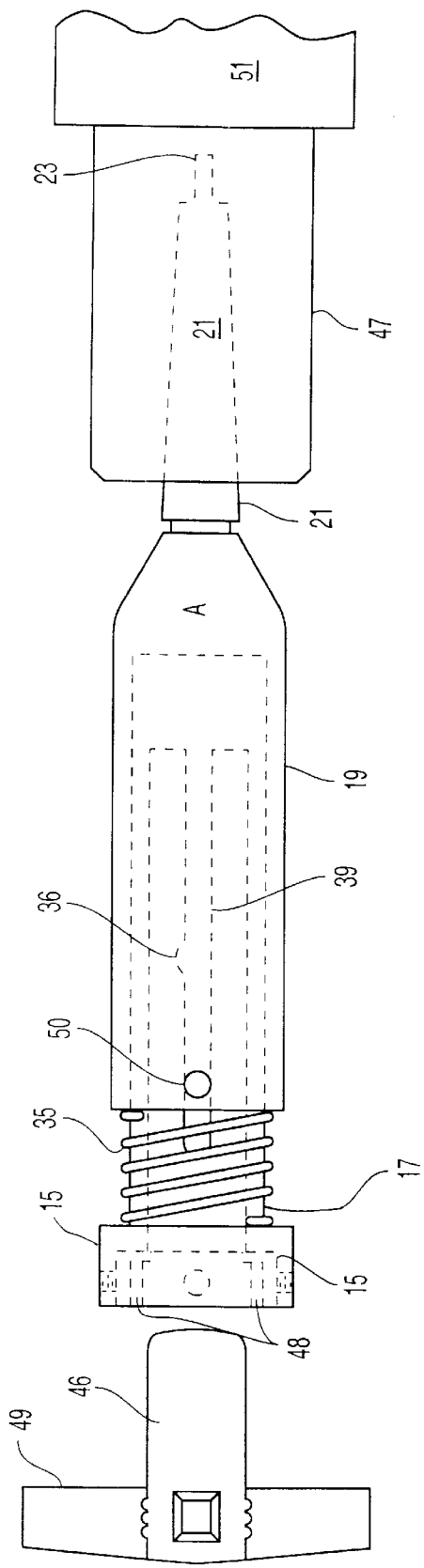
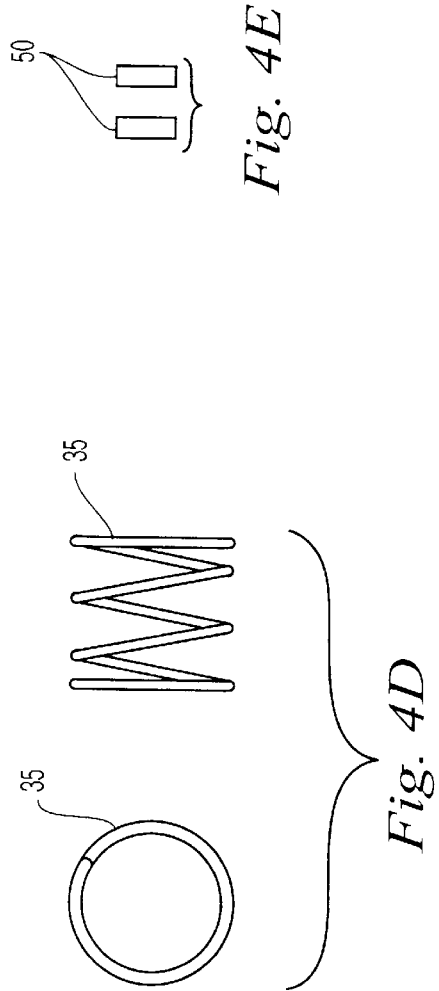
Fig. 3
Fig. 4D
Fig. 4E

TELESCOPING DIE HOLDER

BACKGROUND OF THE INVENTION

Die handles used to holding threading dies in place while chasing or cutting thread operations are performed are known. A round die is inserted into the center of the die handle and locked in place. When used with a lathe to cut threads on a piece of round stock, the extending die handles would rotate with the lathe chuck. To prevent this handle rotation, part of the handle's end typically bears against the lathe while the lathe's chuck turns and the threads/or chasing operations are performed on the stock. While workable, this type of setup presents a potentially very hazardous situation if this handle and lathe bearing positions were to become unseated. If unseated, the handles extending outwardly from 8 to 25 inches would rapidly rotate with the rotating lathe chuck. Their rotating ends could mash or pinch an operator's exposed extremities, inflict severe injury or even cause death to the operator.

The present invention eliminates this potential hazard while holding a round die in place to permit chasing or hassle free thread cutting operations to take place all as more fully described hereafter.

DESCRIPTION OF THE PRIOR ART

Tools used with stock to be turned by a lathe are known. For example, in the Kostka reference (U.S. Pat. No. 2,855,613) a die and tap holder tool is disclosed that has a sleeve with a plurality of longitudinal slots near its ends and a received actuator.

The Johnson et al invention (U.S. Pat. No. 5,271,697) discloses an improved standardized blank adapted for making taps for making tapped holes and an improved positive lock tap holder.

In the McDonnell invention (U.S. Pat. No. 5,343,787) the die holder assembly mounts on a lathe to facilitate the cutting of a thread into a wood piece. A lever rod can be used to manually torque the die holder.

The Forslind invention (U.S. Pat. No. 5,507,608) discloses a piloted hand tool may be used to connect a rotary cutting tool to the chuck of a lathe to provide mechanical axial support and alignment of the tool to the work piece.

The Kanaan invention (U.S. Pat. No. 5,636,851) discloses a tapping collet actuated by engagement with a mating surface of a collet holder for holding a tap having a round shank portion and a square shank portion.

The recent McMaster-Carr Supply Company industrial catalog 104, copyright 1998, on page 1894, discloses Morse Taper Floating die Holders. From the available information, it appears that the McMaster-Carr shank portion is solid, whereas the shank of the present invention is hollow, and the McMaster-Carr die head, although hollow like my die head, is installed around the shank rather than into the shank portion as I do.

The present invention relates to a telescoping die holder having shank mounted within a hollow shell having a tapered tail stock engaging end all as more further set forth in this specification.

SUMMARY OF THE INVENTION

This invention relates to a telescoping die holder having a tapered front morse fitted on a shell into which a shank with a biasing member is inserted. The rear end of the shank is inserted into an opening of the shell. An adaptor may be placed in the front opening of the shank to accommodate different diameter dies.

It is the primary object of the present invention to provide for a way to cut threads on metal bar stock using a die in conjunction with a lathe to make it trouble free and safe.

Another object is to provide for such a holder with an inserted adaptor to accommodate different sized dies.

Still another object is to expedite the thread cutting operation when numerous bar stocks need threading.

These and other objects and advantages of the present invention will become apparent to readers from a consideration of the ensuing description and the accompanying drawings.

BRIEF DESCRIPTION OF THE DRAWINGS

FIG. 1 is a front view of a prior art die handle used to hold threading dies in place.

FIG. 2 is a side view of the invention's preferred embodiment with its optional die adaptor shown detached from the front end of the shank.

FIG. 3 shows a side view of the invention's preferred embodiment mounted in tail stock of the lathe at its rear and disengaged from metal stock to be threaded in the lathe's chuck at its front end.

FIG. 4(d) are front and side views of the spring that encircles the shank.

FIG. 4(e) is a side views of the retaining pins.

DESCRIPTION OF THE PREFERRED EMBODIMENT

Figure 4B:
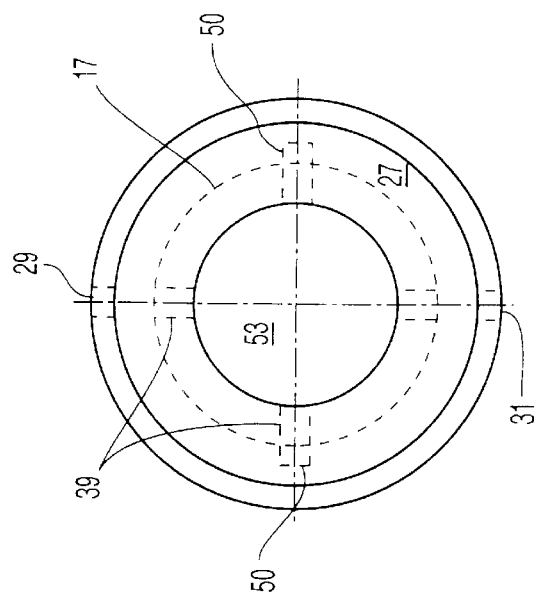
FIG. 4(b) is a front view of the shank.

FIG. 1 is a front view of a typical prior art die handle 1 as currently used to hold threading dies in place. The center round die 3 is locked in place by set member 5 around a round stock or work piece 7 as a threading of chasing operation is performed on the work piece's surface. Typically the work piece 7 is an elongated tubular or solid member, such a metal pipe or bar, having a round cross section with a hollow round or a solid interior, such the one shown. Extending outwardly from the round die 3 are two oppositely directed rigid handles 9 and 11. When used on a lathe, the die's cutting threads engaging the round stock 7 may cause the two joined extended rigid handles (9 and 11) to rotate with the stock. To prevent the rotation of these handles from happening during the performed stock operation, part of the stationary lathe 13 is placed or positioned to bear against one of the handle's ends (e.g., end of handle 11) as the lathe's chuck turns and the work piece operation is performed. Should the rotational movement of the lathe be sufficient to cause the bearing surface 13 to disengage from the handle's end, a hazardous situation is presented as the long (each 8 to 25 inch) handles will swing around and are capable of mashing an operator's extremities between the stationary bearing surfaces 13 and free rotating handles (9 or 11). The present invention is directed to a much safer holder device for a round stock member on which lathe is performing a chasing or cutting thread operation.

FIG. 2 is a side view of the invention's preferred embodiment with its die adaptor 15 shown detached from the front end of the shank 17 which is mounted partially in the larger diameter exterior shell 19. Attached to the rear end of the shank covering shell 19 is a No. 3 morse taper member 21 whose cross sectional transverse diameter gradually decreases towards the rear end until it ends in the still smaller diameter rear section end member 23.

Shank 17 front end has an enlarged diameter front section with an opening receiving portion 25. This opening receiving portion has a rear opening cut out circular indented portion 27 (shown in dotted line format) with two opposite side through threaded holes 29 and 31 through which set screws(not shown) may be inserted. These screws act to hold a die or, if used, to hold the adaptor 15 in place on the shank's end. Encircling the reduced diameter section 33 of the shank 17 and located closer to the shank's front end is a spiral coil spring 35 part of which is shown. An front opened center tubular defined cut out 37 for the shell 19 extends into most of the hollow shell's length and permits the insertion of the shank's reduced diameter section 33 into the shell's cut out interior 37. Extending along part of the total length of shank section 33 are four substantially identical shank slots 39, one of which is shown partially in dotted line format when the shank is in the shell, and in solid line format when the shank is outside of the covering shell 19. Each of the four slots 39 are equally spaced from each other and set around the shank about 90 degrees apart from their most adjacent slot when viewed in the direction from the section's end (see FIG. 8). Each such slot 39 is closed at its front end and opened on its opposite rear end with chamfered sides. There is a slot intersecting half round notch 36 located along the length of each slot 39 whose purpose is described hereafter. Further to the front or left in FIG. 2 is the optional detached adaptor 15 whose outside diameter is such that is can fit within the shank's opened front indented portion 27. Two conventional set screws (not shown) one of which is placed into each of the shank's threaded opposite holes 29 and 31 are used to engage opposite surface cut outs 41 and 43 in the adaptor's periphery to hold the adaptor and die in the shank's front opening 27. An opened front facing indented cut out circular portion 45 in the adaptor 15 permits the adaptor and any attached shank to be fitted to a different sized smaller outer diameter die than could be engaged by the larger diameter indented shank portion 27.

One of the two disposed opposite retaining pins 50 is shown. Each pin moves in a separate opposite slot 39 and each pin also goes through a separate hole 18 in the outer shell 19. The other identical pin 50 (not shown) is similarly located in an opposite side similar shell hole and fit are disposed with respect to the shank's opposite side slot in the same manner. One end of each pin 50 is flush with the outer surface of shell 19 and the other pin end extends in the aligned shank slot 39. The reason for the retaining pins 50 in their respective two slots is to prevent the twisting or turning of the shank with respect to the covering shell when the metal stock is being rotated through the die. In addition, the pins 50 in the shell and shank allow the inner shank to slide in their slots and out of the shell completely and freely within the parameters of the confining slots.

FIG. 3 shows a side view of the invention's preferred embodiment mounted in tail stock of the lathe at its rear end and disengaged from metal stock to be threaded 46 at the shank's front end. Forming part of the conventional lathe is the tail stock 47 formed by a metal hollow centered tubular structure having an opened front end. The majority of the tapered No. 3 morse taper 21 is fitted into this opened front end and is shown in dotted line format, including the totality of its tail stock engaging smaller rear end 23. When the shown stock to be threaded 46, is fitted into the indent of the shank 17 and power supplied to rotate the lathe chuck 49, a chasing or cutting thread operation takes place on the work piece stock 46 by an in place die 48 located in the front indented portion 27. The die 48 is a conventional round metal structure that can have different outside diameter (O.D.) sizes such as 0.750 of an inch, 1.0 inch, 1,250 inches, 1.50 inches, etc. Typically, the thickness or length of the die that would be aligned with the depth of the indentation 27 is 0.250 of an inch, 0.375 of an inch, 0.500 of an inch, 0.625 of an inch, etc. The die has a center hole with thread-like protrusions sticking out from the hole's walls towards the die's center.

The metal stock to be threaded 46 goes through the die hole as the lathe chuck 49 turns the stock resulting in the forming of cutting threads on the metal stock's die/protrusion engaged surface. Retaining pins 50, on opposite sides of the shell 19 and attached to the shell, are press fitted into spaced the two holes 18 in the shell. The pin ends are flush with the shell's outer surface and the pins extend inwardly in the shank wall 17 and each pin rides in its separate opposite side elongated shank slot 39. The pins thus act to hold the shell 19 to the shank and to allow for reciprocal movement of the shank 17 relative to the shell via their slot connections.

Further to the rear or right is the lathe's tail stock 47 and 51 used to horizontally support the entire telescoping assembly. A crank handle (not shown) of the tail stock can be moved to push the telescoping assembly against the work piece 46. The telescoping assembly is made up of the shank 17, the shell 19, the interconnecting two pins 50 and the four shank slots 39 plus the front adaptor apparatus 15, if used, and its described adaptor sub components.

FIGS. 4(a)–(e) show unassembled views of the several different individual components making up the invention's preferred embodiment. In these figures the optional die adaptor 15 shown in FIG. 2 is absent. In the FIG. 4(a) side view the previously described shank 17 with one of its four elongated front closed ended slots 39 is shown extending along most of the shank's length. The slots 39 go in and through the center of the shank's circular hollow wall portion 52 except near the front end of the shank. The wall 52 is hollow and extends the length of the shank from the shank's opened end 55 to the cut out indent 27 located at the shank's front end.

FIG. 4(b) is a front view looking from the shank's front end towards its rear end. Clearly visible in this view is the center length hollow portion 53 located in the reduced diameter shank portion 33 and the greater diameter front indent 27. The dotted circle is the outside diameter of the more rearward and small diameter shank 17. The previously described through opposite screw holes 29 and 31 in the enlarged diameter front shank portion 25 are also shown in dotted line format. Two shell/shank retaining pins 50—shown in dotted line format—are, when inserted through the shell (not shown) into the shank, each spaced 180 degrees from the other and on opposite sides as shown.

Figure 4A:
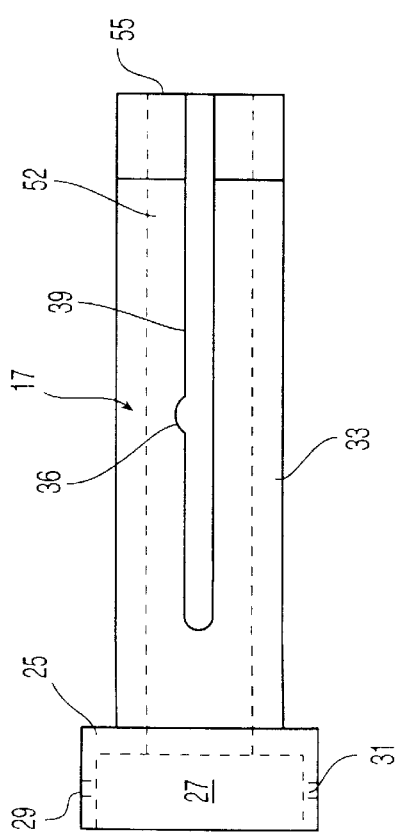
FIG. 4(a) is a side view of the shank.
Figure 4C:
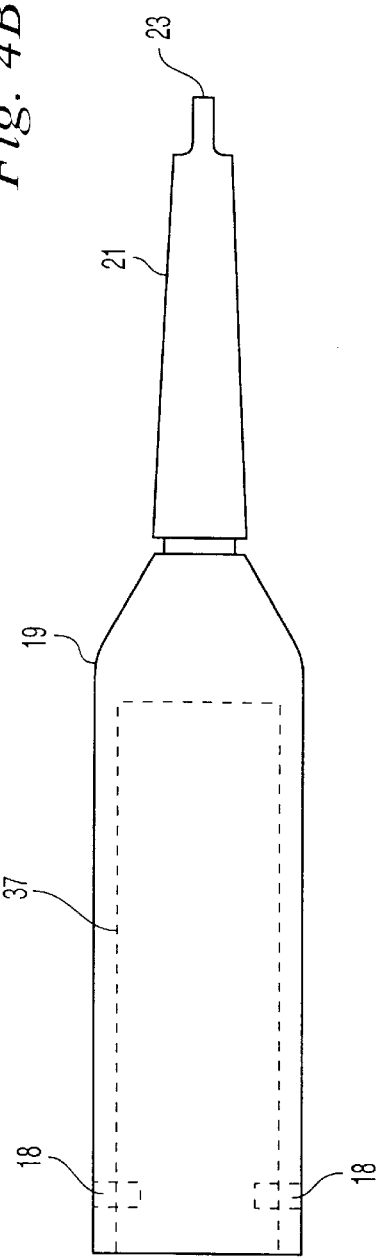
FIG. 4(c) is a side view of the shell with the shank insert and turned ninety degrees from the views shown in FIG. 4(a) and FIG. 4(b).

Bridging FIGS. 4(a) and 4(c) is a dotted arrow which indicates how the shank 17 of FIG. 4(a) can be fitted within the hollow front opened end and closed rear end portion of shank enclosing shell 19 shown in FIG. 4(c). The shell is turned ninety degrees in the latter figure with respect to FIGS. 4(a) and (b). Two opposite side shell holes 18 extend through the shell's surface are used to mount the two pins 50. The pins 50 only protrude far enough into the hollow interior of the shank 17 until they are flush with the shank's inner diameter walls defined by the opening 53.

FIG. 4(d) illustrates the shank portion 33 encircling spring 35 viewed both lengthwise (right) and from the front (left view). When in place, the spring 35 is between and bears against the rear side of the larger diameter portion 25 and the shell. This provides a biasing force on the front end of shell 19 which force becomes greater as the shank mounted shell compresses the spring as it moves to the left or front as shown in FIGS. 2 and 4.

FIG. 4(e) depicts the two identical retaining pins 50 that are pressed into the holes (e.g., the holes 18) extending through the shell's 19 surface and whose ends are located in slots 39 of shank 17. Each pin 50 is pressed through its shell hole to engage one of the slots 39 in shank 17. As mentioned previously, these retaining pins 50 prevent the shank from turning relative to the shell during the cutting operation. The shank should be stationary as the lathe rotates when thread cutting to takes place.

Figure 6:
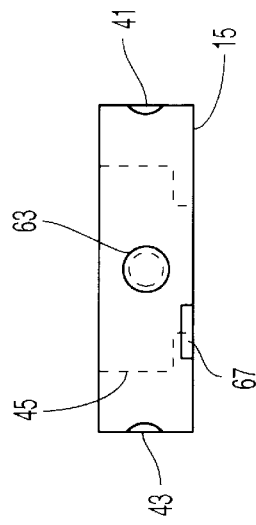
FIG. 6 is a top view of an adaptor usable with the preferred embodiment.
Figure 5:
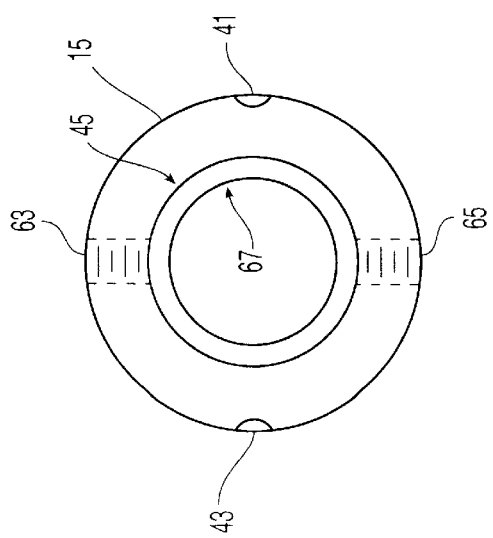
FIG. 5 is a front view of an adaptor usable with the preferred embodiment.

FIGS. 5–6 show front and top views, respectively, of the optional die adaptor 15 that can be used with the invention's preferred embodiment. The FIG. 5 front view shows the adaptor 15 of FIG. 2 turned ninety degrees and looking from the front (or left) towards the rear (or right) of the adaptor. The previously shown surface top and bottom indentations 41 and 43 are oriented to the left and right in this turned viewed when the two opposite through adaptor holes 63 and 65 are now rotated to be on the top and bottom of the adaptor. The each hole is about 90 degrees apart from its adjacent indentations as shown. The through holes 63 and 65 in the adaptor receive set screws, such as standard ¼ inch −28×¼ inch long screws (not shown), used to tighten the circular die in place within the die receiving adaptor. The larger diameter outer circular indentation 45 into which these through holes extend is shown enclosing the smaller diameter more rear through hole 67 which is located at the rear end of the adaptor in FIG. 2.

The FIG. 6 top adaptor view shows the upper through hole 63 and the two cut out adaptor surfaces which define the limits for the outer hole 45 and the inner or rear hole 67. The opposite side round shaped indentations 41 and 43 are also visible in this view and are used to receive set screws through the holes 29 and 31 of the shank's enlarged diameter front end portion 25. Clearly, the adaptor diameters of the circular cut outs 45 and 67 can hold in place one particular size die. Normally there is only one size adaptor for this particular telescoping die holder.

Figure 7:
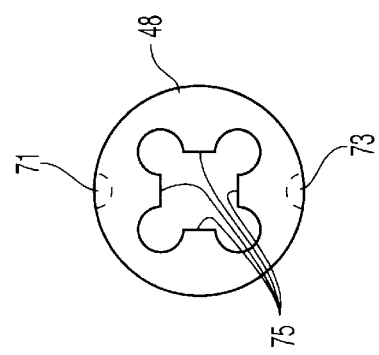
FIG. 7 is a typical cutting die that can be used with the adaptor of FIGS. 5–6.

FIG. 7 is a typical one inch diameter cutting die 48 that can be used with the adaptor 15. As shown, this typical die, is circular in outer configuration when viewed in the direction of the arrow C in FIG. 2. Two opposite surface indentations 71 and 73 are located on the periphery of the die's surface and are used to engage the ends of two screws that extends through the holes 63 and 65 shown in FIG. 5 to hold the die in place to the adaptor. These inserted screws prevent the die's rotation with respect to the member 15. In the center of the die there is a cut out portion surrounded by four protruding spaced teeth 75 which perform the actual cutting operation on the stock 46 previously mentioned.

Referring again to FIGS. 2 and 3, the assembled shank and shell are slid forward toward the round metal stock 46 to be threaded. At this point the die in the holder should be lined up with and up against the metal stock and then the tail stock on the lathe is locked tight. The spindle on the lathe chuck 49 is engaged to rotate. As the hand crank on tails stock (not shown) is turned, the spring 35 located between shank head and its heel is compressed placing a greater compression pressure on the die 48 against the engaged metal stock 46. This greater pressure allows the die's protrusions to bite into the stock and begin the thread cutting of the stock.

As the stock threading operation takes place, the operator can unlock the tail stock end 51 on the lathe. When this occurs the metal stock 46 (see FIG. 3) will pass through shank's opening telescoping die holder and tail stocks 51 will move toward the metal stock 46. In case this doesn't happen, a slot intersecting half round notch 36 located along the length of each slot 39 can be provided (see FIGS. 2, 3 and 4(a)) to make sure it does. When the end of the metal stock 46 impacts inner back wall of the shell 19, it telescopes the shank out of the shell as shown in FIG. 3. Shank 17 moves out of the shell 19 when the metal stock 46 hits the shell wall location A of FIG. 3. The four slots 39 and their two engaged retaining pins 50 keep the shank 17 from spinning with the lathe's chuck 49 and these pins will be forced out of their notches 36. Then the shall will move out of the shank giving a full length threaded cut.

At this point more explanation is need on the notch 36. It is a half round notch that extends through the shank wall on the same one side of each of the four slots 39. This notch 36 is added in case, after the tail stock lathe is unlocked during the cutting operation, the shank slides out of the shell with the shell tail stock stationary. During this movement each retaining pin 50 moves in the shank slot 39 and falls into its own notch 36 which action cause the entire assembly and tail stock to move. This more or less locks the shell and shank together. If this locking action didn't happen, shank 17 would slide out of the covering shell giving only a partial thread cut length to the engaged metal stock. But when pins 50 lock in the slot notches 36 they move the assembly and stock. When metal stock 46 hits the back wall A (see FIG. 3) of the shell the pins 50 are forced out of their notches 36 resulting in the shank moving out to give a full length threaded cut to the stock. At this point the operator would have to align the shank inserting in shell then reverse the lather chuck. Then the lathe's chuck is reversed turning metal stock or work piece 46 out of engagement with the invention's die revealing a threaded rod up to 10 inches long.

Figure 8:
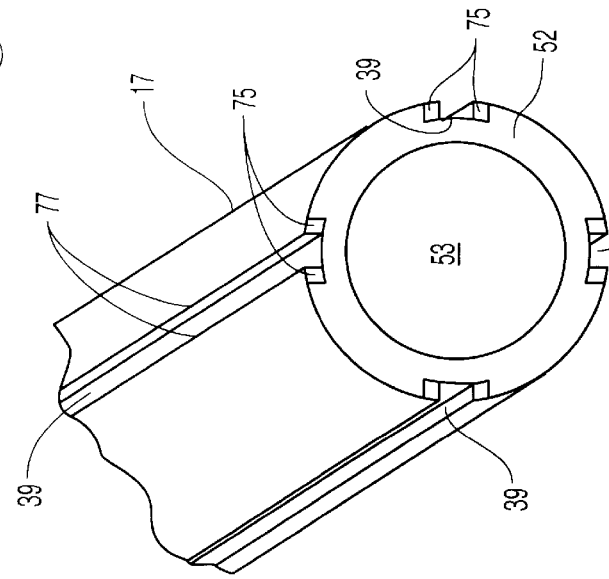
FIG. 8 is a perspective end view of the shank illustrating the four chamfered rear spaced slots.

FIG. 8 is a perspective end view of the shank illustrating the opened end of the four spaced slots. The four spaced slot 39 ends each have chamfer opened ends 75 that expand outwardly from the slot's channel. Before the 1/64 of an inch chamfer operation is done on the slots ends, a flat grind operation of about 0.005 of an inch 77 was completed on the top of each slot. When the shell is completely removed from the shank at the shown ends, the shell can be shaken and air (compressed) cleaned to remove metal chips therefrom. The shank chamfer ends assist in keeping the die holder from being damaged at the end of the thread cutting operation.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A telescoping die holder apparatus for use with a lathe, said lathe having a hollow tail stock first end for receiving and retaining a shell and a rotatable lathe chuck at another end of the shell used to retain a work piece stock that is adapted to engage an enlarged front end of a shank used to hold a die, comprising:

an elongated shank section having a length with an enlarged diameter front end for holding a cutting die, said shank section having a hollow interior portion extending through the length of the shank section;

a shell having a larger diameter cross section than most of said shank section and adapted to fit over and substantially cover most of said shank section along the shank's length, said shell having a front shank receiving opening and a closed rear end portion with a smaller diameter cross sectional rear section with a tapered rear end; and a compressible biasing means mounted on said shank section between the shank and the shell and positioned to engage said shank's enlarged diameter front end, whereby said shell's opened front end is biased rearwardly with respect to the shank when said biasing means is compressed.

2. The apparatus as claimed in claim 1, wherein said shank has a plurality of substantially identical slots that extend along the length of the shank with each slot having one closed end, said slots being spaced from each other around the shank and having opened ends opposite their closed ends, and retaining pins adapted to engage with each of said shank slots, each of said retaining pins extending through a hole in said shell into one of said shank slots to prevent the rotation of the shell and shank with respect to each other when engaged lathe work stock is rotating.

3. The apparatus as claimed in claim 2, wherein there are four of said slots each of which slots is spaced about 90 degrees apart from an adjacent slot, two of said four slots opposite each other having an intersecting retaining pin cut out portion.

4. The apparatus as claimed in claim 3, wherein the opened ends of each slot have outwardly opening chamfer rear ends.

* * * * *

UNITED STATES PATENT AND TRADEMARK OFFICE
CERTIFICATE OF CORRECTION

PATENT NO. : 6,092,445
DATED : JULY 25, 2000
INVENTOR(S) : Jerry Lynn Skackelford It is certified that error appears in the above-identified patent and that said Letters Patent is hereby corrected as shown below:

On the title page, please correct the inventor's name to read as follows: --Jerry Lynn Shackelford--.

Signed and Sealed this

Twenty-ninth Day of May, 2001

Attest:

Attesting Officer

NICHOLAS P. GODICI

Acting Director of the United States Patent and Trademark Office